United States Patent
Ceccom et al.

(10) Patent No.: US 6,943,700 B2
(45) Date of Patent: Sep. 13, 2005

(54) DISTRESS BEACON, PROCESS AND DEVICE FOR MONITORING DISTRESS SIGNALS, AND VEHICLE ON WHICH SUCH A DEVICE IS INSTALLED

(75) Inventors: René Ceccom, Saiguede (FR); Claude Pichavant, Toulouse (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/376,523

(22) Filed: Feb. 27, 2003

(65) Prior Publication Data

US 2003/0164769 A1 Sep. 4, 2003

(30) Foreign Application Priority Data

Mar. 1, 2002 (FR) .......................................... 02 02621

(51) Int. Cl.⁷ .............................................. B64D 47/06
(52) U.S. Cl. .................... 340/981; 340/945; 340/963
(58) Field of Search ............................... 340/945, 963, 340/970, 981, 971; 701/3, 9, 14

(56) References Cited

U.S. PATENT DOCUMENTS

| | | | |
|---|---|---|---|
| 4,835,537 A | * | 5/1989 | Manion .......................... 342/30 |
| 4,850,031 A | | 7/1989 | Allsop et al. .......... 219/121 PY |
| 4,978,945 A | * | 12/1990 | Funatsu ....................... 340/961 |
| 5,073,972 A | | 12/1991 | Tendler et al. ................. 455/38 |
| 5,649,059 A | * | 7/1997 | Tendler et al. ............... 704/275 |
| 6,275,164 B1 | * | 8/2001 | MacConnell et al. ........ 340/692 |
| 6,438,492 B1 | * | 8/2002 | Le Tallec et al. ............ 701/301 |

FOREIGN PATENT DOCUMENTS

| | | |
|---|---|---|
| DE | 199 22 608 A1 | 11/2000 |
| EP | 0 107 596 | 5/1984 |
| WO | WO 99/43091 | 8/1999 |

* cited by examiner

*Primary Examiner*—Brent A. Swarthout
(74) *Attorney, Agent, or Firm*—Thelen Reid & Priest, LLP

(57) ABSTRACT

This invention relates to a distress beacon comprising at least one transmitter stage (22) connected to an antenna, and one receiver stage (21) locked onto a distress frequency connected to the said antenna (25), and a detection module connected to the output of this receiver stage (21) capable of activating a signal in order to indicate an alarm.

This invention also relates to a device for implementing this process.

9 Claims, 1 Drawing Sheet

DISTRESS BEACON, PROCESS AND DEVICE FOR MONITORING DISTRESS SIGNALS, AND VEHICLE ON WHICH SUCH A DEVICE IS INSTALLED

CROSS-REFERENCE TO RELATED APPLICATION

This application claims priority based on French application no. 02 02621, filed on Mar. 1, 2002, entitled "Distress Beacon, Process And Device for Monitoring Distress Signals, And Vehicle On Which Such A Device Is Installed" by Rene Ceccom and Claude Pichavant.

TECHNICAL FIELD

This invention relates to a distress beacon, a process and a device for monitoring distress signals, and a vehicle such as an aircraft, a boat, etc. on which such a device is installed.

STATE OF PRIOR ART

Vehicles such as aircraft, boats, etc., may be equipped with distress beacons in a known manner. In the case of civil transport aircraft used to cross large expanses of water or to overfly some countries, the use of such beacons is a requirement formulated by the ICAO (International Civil Aviation Organization) (see the ICAO "Chicago Convention" agreement in appendix 6, part 1, chapter 6, §6.17, seventh edition (July 1998); modified by amendment No. 24, July 1999). One of the distress emission frequencies for these beacons is 121.5 MHz, which is also the transmission distress frequency in voice.

Conventionally, as illustrated in FIG. 1, such a beacon 10 comprises a VHF transmitter stage 11 connected to an antenna 12. This VHF transmitter stage may in particular be activated by the pilot of an aircraft, or by a shock detection device. It then transmits a characteristic audio signal on frequency 121.5 MHz (A3X type modulation) and possibly also information coded, for example, in Morse in order to identify the said beacon. The distress frequency may also be used by a radio operator in a distress situation, who then transmits a voice signal with an A3E type modulation.

This distress frequency is continuously monitored by emergency services. However, there are areas on the earth's surface that are not covered by such emergency services (desert areas, etc.). In this case, crews on vehicles passing through these areas and on which VHF receivers are fitted monitor the said distress frequency. They can thus alert rescue teams if a distress signal is received and also help locate the transmitting source of the signal. Such an operating mode necessitates a dedicated VHF receiver on the said vehicle for monitoring the distress frequency. However, most civil transport aircraft are currently equipped with three VHF transceivers that are already used for voice communications with control centers and/or with airline companies and with data links with airline companies. The use of one of the said VHF receivers for monitoring the distress frequency is penalizing because in this case only the two remaining transceivers can be used for the above-mentioned communications.

Therefore, the problem arises of continuously monitoring signals received on the distress frequency without monopolizing one of the three above-mentioned VHF transceivers.

One method of solving this problem would consist of adding a fourth VHF transceiver onboard the aircraft. However, current aircraft are designed to operate with three VHF transceivers. Major modifications would be necessary if a fourth transceiver were added, particularly related to man/machine interfaces through which members of the crew configure the said transceivers, and communication protocols between the said man/machine interfaces and the said transceivers. Therefore the cost of such modifications would be very high. Furthermore, an antenna dedicated to the fourth VHF transceiver would have to be added, which could cause layout problems on the fuselage, particularly for small aircraft due to constraints related to the need to prevent mutual interference of communications related to the different VHF transceivers considered.

Another method would consist of time multiplexing between the distress frequency and another VHF frequency used by crew members for communications with control centers or airline companies. However, there is a risk of distress signals being lost during time periods dedicated to the said communications.

Another method would consist of using a receiver dedicated to monitoring the distress frequency in parallel with one of the three existing VHF transceivers so that it shares the same antenna with this transceiver. However, due to the use of a common antenna, this new receiver would not be operational during transmission phases of the transceiver considered.

The purpose of this invention is a distress beacon, a process and a device that can overcome this problem by monitoring reception of signals on a distress-frequency and activating an alarm signal following detection of such a distress signal.

PRESENTATION OF THE INVENTION

This invention relates to a distress beacon capable of transmitting a distress signal when it is activated, comprising a transmitter stage connected to an antenna, characterized in that it also comprises a receiver stage fixed to a distress frequency and connected to the said antenna, a diplexer for connecting the antenna to the transmitter stage and to the receiver stage, and a detection module connected to the output from this receiver stage capable of activating a signal in order to indicate an alarm when a distress signal is received by the receiver stage on this distress frequency.

Advantageously, this beacon also comprises an amplifier placed between this transmitter stage and this diplexer.

This invention also relates to a process for reception of a distress signal on a distress frequency by a receiver stage of a vehicle, and processing of this signal, characterized in that it uses a distress beacon installed onboard this vehicle capable of transmitting a distress signal when it is activated, comprising a receiver stage dedicated to reception of a distress frequency and an associated detection module, the said process also comprising the following steps:

- continuous listening to this distress frequency using this receiver stage,
- the detection module detects the reception of a distress signal on this distress frequency,
- a discrete signal is activated when such a distress signal is received,
- signal an alarm to the vehicle crew members.

In one embodiment, this discrete signal is sent to a processing device that outputs visual or audio information to the vehicle crew. Acknowledgement of this information by the crew can inhibit the alarm but it cannot inhibit transmission of the alarm to the detection module which maintains the indication that a distress signal has been received as long as the power of this signal remains greater than a predetermined threshold value.

In another embodiment, the vehicle is an aircraft and an alarm can only be triggered if the altitude of the said aircraft is greater than a predetermined threshold value.

In another embodiment, the alarm is not triggered unless a signal is received on the distress frequency for a period exceeding a predetermined threshold value.

In another embodiment, when an alarm is triggered by a computer located in the vehicle, the vehicle communicates with a VHF transceiver tuning device located in the said vehicle in order to preselect the said distress frequency on this tuning device, and when members of the crew want to listen to this distress frequency, all they have to do is to validate it on one of these VHF receivers.

This invention also relates to a distress signal reception and processing device that uses such a distress beacon capable of receiving signals of the same frequency as its transmission frequency.

This device may advantageously be used in a vehicle such as an aircraft, a boat, etc.

The process and the device according to the invention have several advantages.

A first advantage is related to continuous monitoring of the distress frequency, except during phases in which this function is deliberately inhibited, for example take off and landing of an aircraft.

Considering the use of a common antenna for transmission and reception of this beacon, the said distress frequency can only be monitored while the said beacon is transmitting a distress signal. However, this characteristic is not a problem since in the case of such a transmission, crew members do not have enough time to listen to other vehicles in difficulty.

Another advantage is related to the fact that transceivers on the aircraft remain available for communications related to navigation of the aircraft, in voice and in data link with ground control, airline companies, etc. According to the process described in the invention, one of them is used, if crew members consider it helpful, only when the distress signal has actually been detected.

DETAILED DESCRIPTION OF PARTICULAR EMBODIMENTS

An aircraft type vehicle equipped with three VHF transceivers is considered as an example for the remainder of the description.

Figure 1:
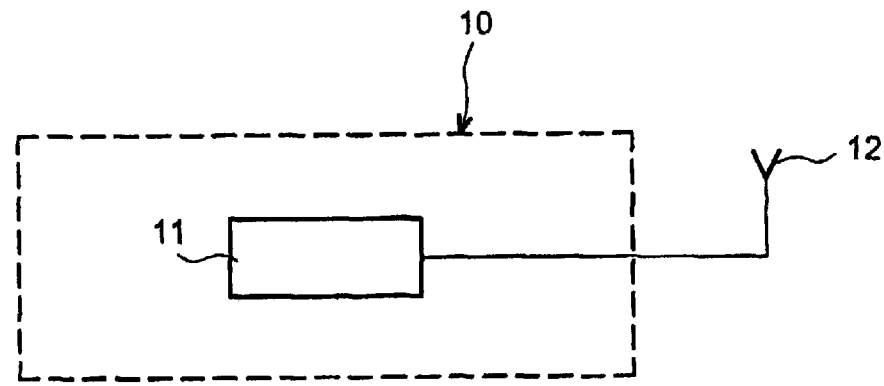
FIG. 1 illustrates a device according to prior art.
Figure 2:
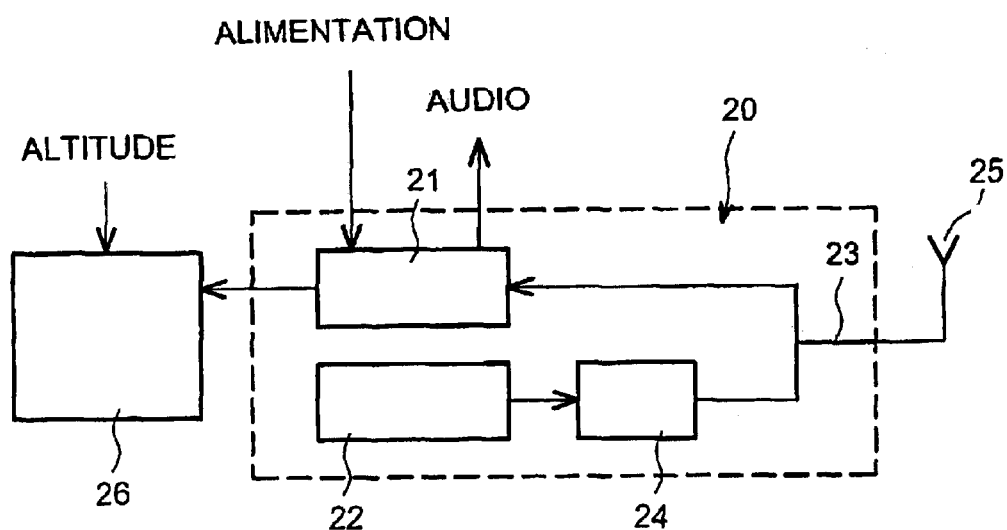
FIG. 2 illustrates the reception and processing device for a distress signal according to the invention.

FIG. 2 illustrates a beacon 20 according to the invention that comprises:
- a receiver stage 21 into which a power supply signal is input, and thus has an audio output,
- a transmitter stage 22,
- a diplexer 23 connected firstly to the receiver stage 21 and secondly to the transmitter stage 21 through an amplifier 24.

This beacon 20 is connected firstly to an antenna 25, and secondly to a computer 26 that triggers notification to the aircraft cockpit that a distress signal has been received, this computer 25 receiving altitude information.

The reception and processing process for a distress signal according to the invention comprises the following steps:

- continuous listening of a distress frequency using a dedicated receiver stage 21 integrated into the distress beacon 20;
- detection of reception of a distress signal on this distress frequency;
- activation of an alarm when such a distress signal is received;
- signaling of this alarm to the aircraft crew members.

Crew members can then decide, if they wish, to listen to the said distress frequency using one of the three above-mentioned VHF receivers.

The first step in this process consists of continuously listening to the distress frequency using the receiver stage 21 integrated in the distress beacon 20. We have already seen it is an ICAO requirement to carry such a distress beacon for aircraft flying on some routes. Therefore one such beacon is already installed onboard the aircraft on which the process according to the invention is to be used this beacon does not transmit anything under normal operating conditions of the aircraft. Consequently, its antenna can be used to receive a VHF signal.

According to the invention, this beacon is modified by adding the receiver stage 21 fixed to the said distress frequency to it and sharing the antenna 25 of the transmitter step 22. A detection module not shown in FIG. 2 is connected to the output from this receiver stage 21.

When modulation of the carrier frequency is detected (above mentioned distress frequency), this detection module activates a discrete signal to indicate an alarm. This discrete signal may for example be connected to an input of the computer 26 that signals this alarm to crew members in the cockpit. This information may be transferred in visual or audio form, etc.

Acknowledgement of this information by the crew inhibits the alarm in the cockpit but it is not transmitted to the detection module that keeps the reception indication of a received signal as long as the power of the signal remains above a predetermined threshold value.

The said discrete signal may also be transmitted to the computer using a digital communication bus.

In a preferred embodiment of the invention, an alarm may only be triggered if the aircraft is at an altitude of more than a predetermined threshold value (for example 10000 feet, or 3048 meters). This limitation avoids disturbing crew members during take off and landing phases during which they must already carry out a number of important tasks and monitor a large number of aircraft parameters.

According to another preferred embodiment of the invention, the alarm is only triggered if a distress signal is received continuously on the distress frequency for a period longer than a predetermined threshold value. This avoids signaling parasite detections on this frequency.

According to another preferred embodiment of the invention, as shown in FIG. 2, an amplifier 24 is added between the transmitter stage 22 and the diplexer 23 so that the antenna 25 can be connected both to the transmitter stage 22 and the receiver stage 21 to compensate for the reduction in the transmission power at the output from antenna 25 related to the said diplexer 23.

In another preferred embodiment of the invention, when an alarm is triggered by the said computer, the computer communicates with a device for tuning of all VHF transceivers on the aircraft, for example such as RMP (Radio Management Panel), VHF Control Panel, RAIMP (Radio and Audio Integrated Management Panel), RCP (Radio Control Panel) or RTP (Radio Tuning Panel), in order to preselect the said distress frequency on this tuning device. If crew members want to listen to this distress frequency, they simply need to validate it on one of the three possible VHF receivers.

The invention also relates to a device comprising such a distress beacon integrating a receiver to implement this process.

What is claimed is:

1. Distress beacon installed onboard a vehicle comprising a plurality of VHF transceivers, said beacon comprising:

a transmitter stage, which transmits a distress signal when said beacon is activated;

a receiver stage for continuous listening of a distress frequency; and a diplexer connected to said transmitter stage and to said receiver stage for connecting one of these stages to an antenna, said receiver stage being connected to a computer in the vehicle, which activates a discrete signal and triggers an alarm to vehicle crew members when a distress signal is received by the receiver stage on said distress frequency, and which communicates with a tuning device of said VHF transceivers, when an alarm is triggered in order to preselect said distress frequency on this tuning device such that when vehicle crew members want to listen to said distress frequency, they have only to validate the distress frequency on one of said VHF receivers.

2. Beacon according to claim 1, further comprising an amplifier placed between the transmitter stage and the diplexer.

3. Device for reception and processing of a distress signal that uses such a distress beacon according to claim 1, capable of receiving signals of the same frequency as its transmission frequency.

4. Use of a device according to claim 3 in a vehicle.

5. Method for reception of a distress signal on a distress frequency by a receiver stage of a vehicle which comprises a plurality of VHF transceivers, wherein a distress beacon, capable of transmitting a distress signal when it is activated, is installed onboard said vehicle and wherein said beacon comprises said receiver stage and a detection module connected to the output of said receiver stage, said method comprising:

continuous listening of the distress frequency using said receiver stage;

detection by the detection module of the reception of a distress signal on the distress frequency;

activating a discrete signal when such a distress signal is received;

signaling an alarm to vehicle crew members;

communicating with a tuning device of said VHF transceivers, when an alarm is signaled in order to preselect said distress frequency on this tuning device; and validating by the vehicle crew members of this distress frequency on one of said VHF receivers.

6. Method according to claim 5, in which this discrete signal is sent to a processing device that outputs visual or audio information to the vehicle crew members.

7. Method according to claim 6, in which acknowledgement of this information by the vehicle crew members inhibits the alarm but it is not transmitted to the detection module which maintains the indication that a distress signal has been received as long as the power of this signal remains greater than a predetermined threshold value.

8. Method according to claim 5, in which the vehicle is an aircraft and an alarm can only be triggered if the altitude of the aircraft is greater than a predetermined threshold value.

9. Method according to claim 5, in which the alarm is not triggered unless a signal is received on the distress frequency for a period exceeding a predetermined threshold value.

* * * * *